United States Patent [19]

Siperko

[11] Patent Number: 5,048,357

[45] Date of Patent: Sep. 17, 1991

[54] TRANSLATION/ROTATION CONVERSION APPARATUS

[76] Inventor: Eric O. Siperko, P.O. Box 743, Angwin, Calif. 94508

[21] Appl. No.: 587,058

[22] Filed: Sep. 24, 1990

[51] Int. Cl.⁵ .................... F16H 15/08; F16H 23/00; F16H 21/44
[52] U.S. Cl. ........................................ 74/110; 74/200; 74/201; 74/60
[58] Field of Search .................. 74/60, 110, 199, 200, 74/201; 384/609, 610, 611, 612; 310/90.5

[56] References Cited

U.S. PATENT DOCUMENTS

| | | | |
|---|---|---|---|
| 815,345 | 3/1906 | Gulowsen | 74/199 X |
| 1,538,564 | 5/1925 | Leon | 384/609 |
| 1,819,826 | 8/1931 | Sherman | 74/60 X |
| 2,170,058 | 8/1939 | Larkin | 74/60 X |
| 2,432,044 | 12/1947 | Scherr | 74/60 |
| 2,548,686 | 4/1951 | Sherman | 74/60 |
| 3,530,732 | 9/1970 | Kashihara | 74/199 |
| 4,103,556 | 8/1978 | Niday | 74/60 X |
| 4,155,407 | 5/1979 | Christiansen | 74/60 X |
| 4,919,002 | 4/1990 | Kume | 74/199 |

FOREIGN PATENT DOCUMENTS 1118434 6/1956 France .................. 74/199

Primary Examiner—Allan D. Herrmann
Assistant Examiner—Julie Krolikowski
Attorney, Agent, or Firm—Douglas E. White

[57] ABSTRACT

Translation/rotation conversion apparatus includes a rotatable follower shaft having an oval follower slant mounted thereon at an oblique angle with respect thereto. A rotatable drive shaft is disposed parallel to the follower shaft and has an oval drive slant mounted on it at the same oblique angle with respect to it that the follower slant makes with respect to the follower shaft. Planar faces of the two slants are engaged together in flat overlapping relationship. At least one shaft, preferably the drive shaft, is free to translate back and forth as it rotates.

18 Claims, 5 Drawing Sheets

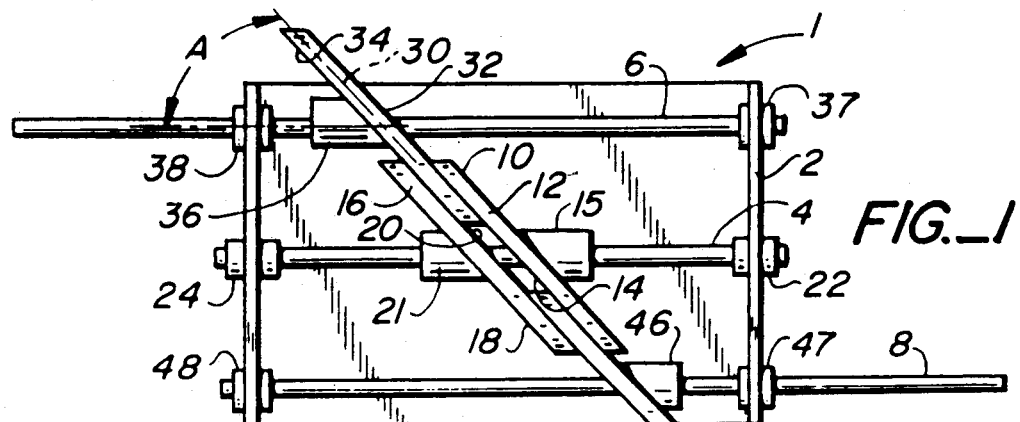
FIG._1
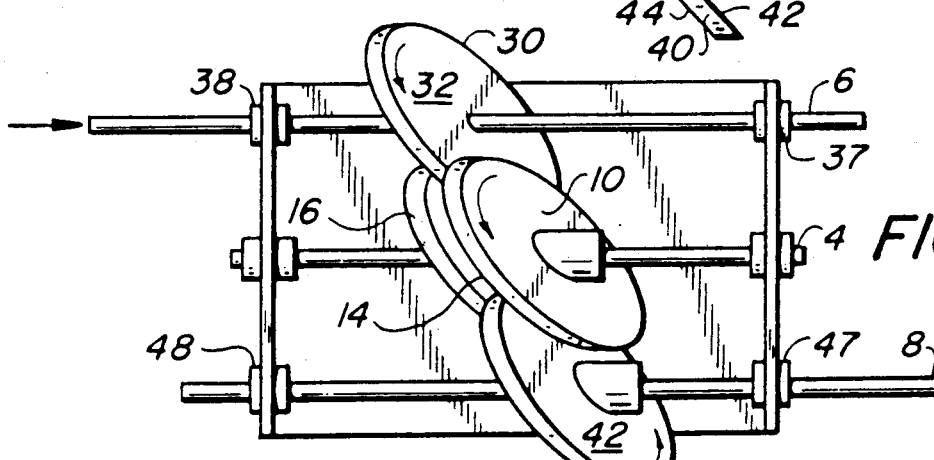
FIG._2
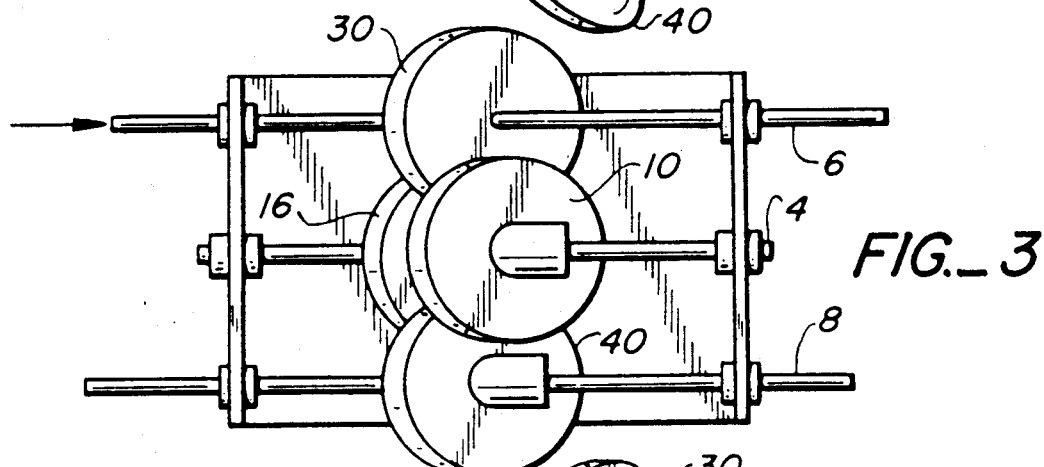
FIG._3
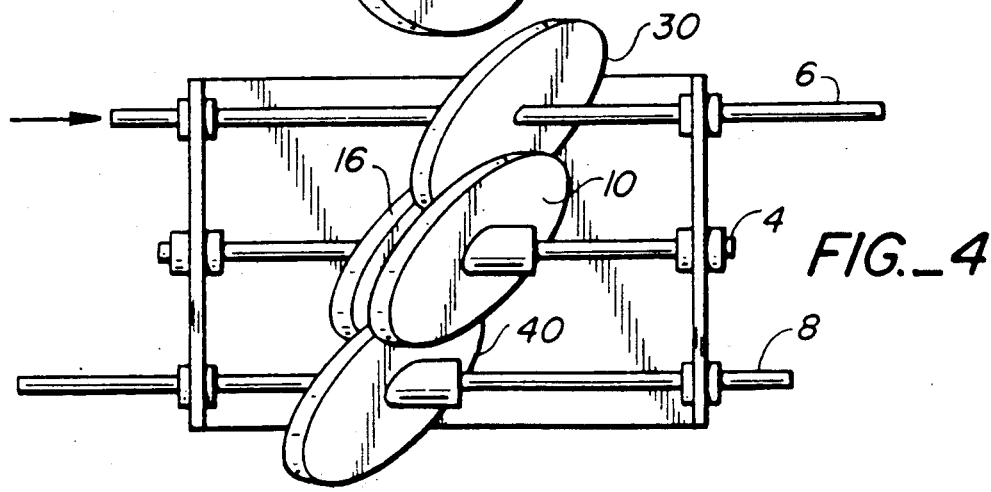
FIG._4

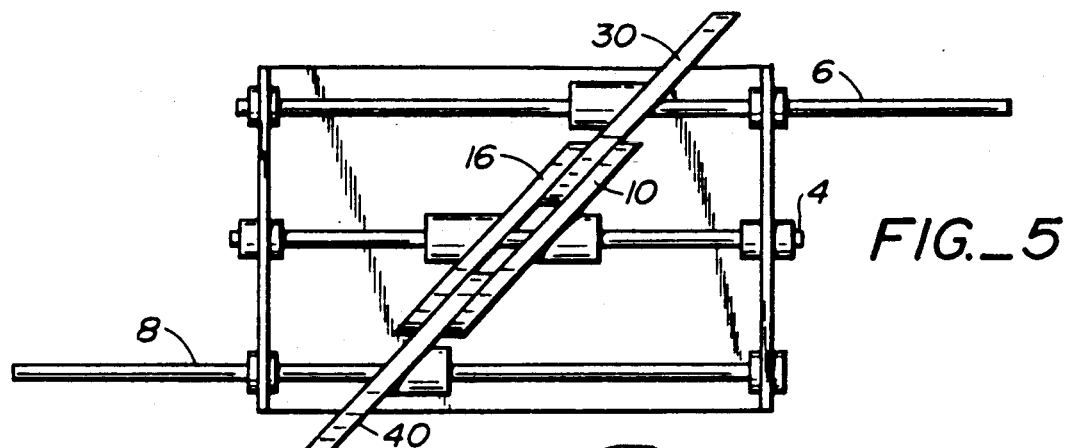
FIG._5
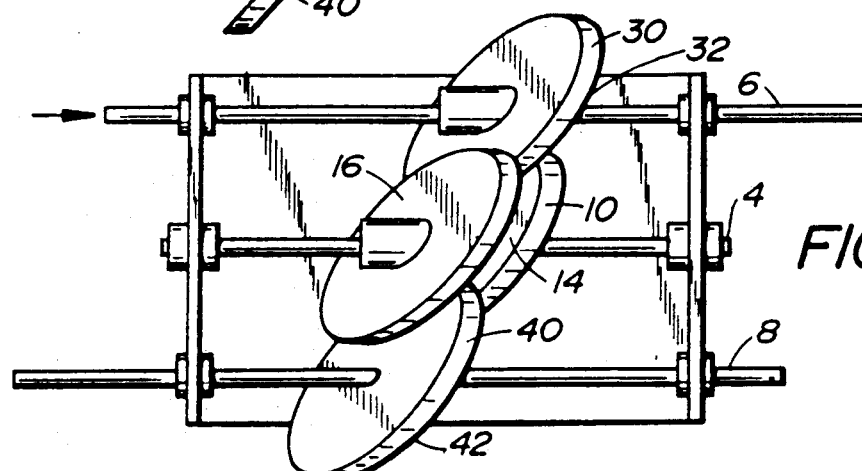
FIG._6
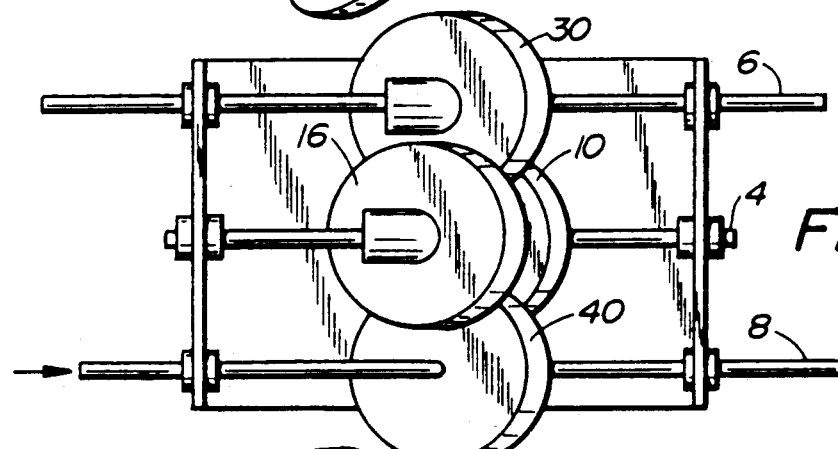
FIG._7
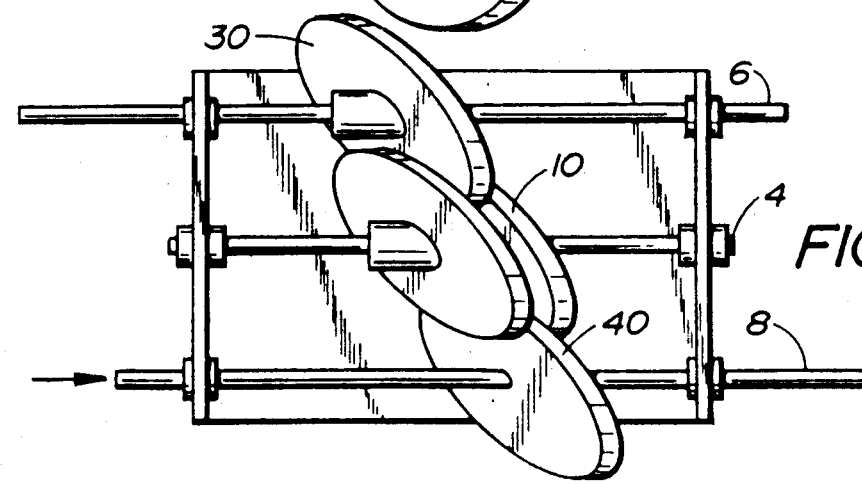
FIG._8

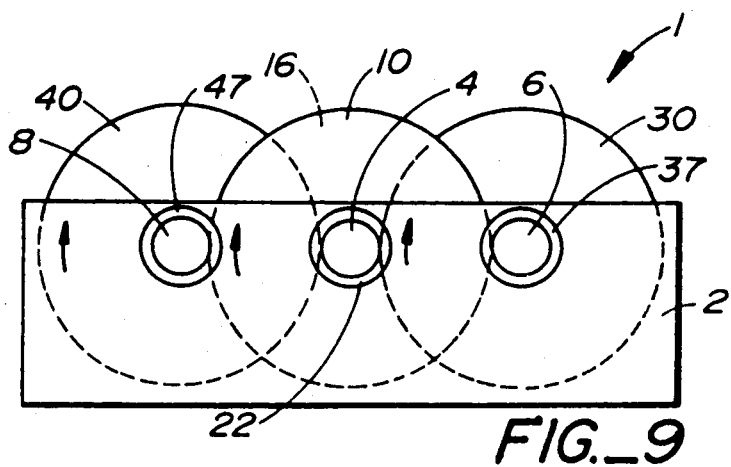
FIG._9
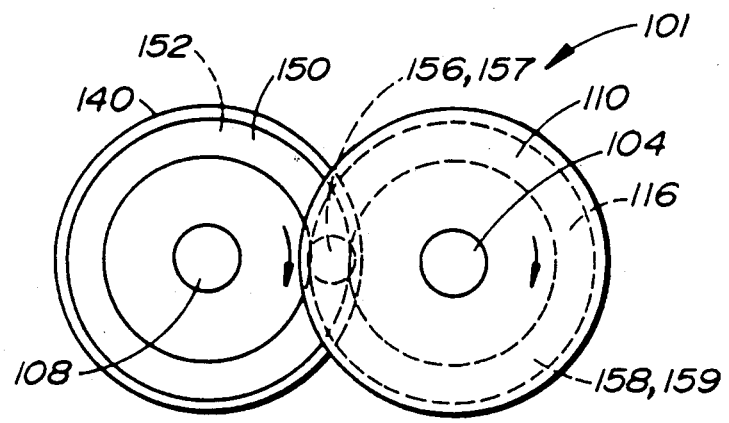
FIG._10
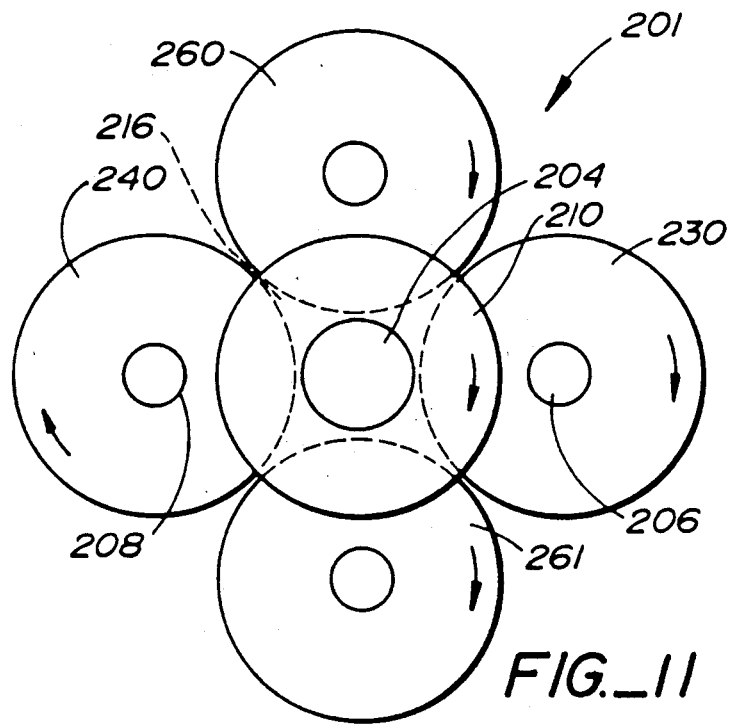
FIG._11

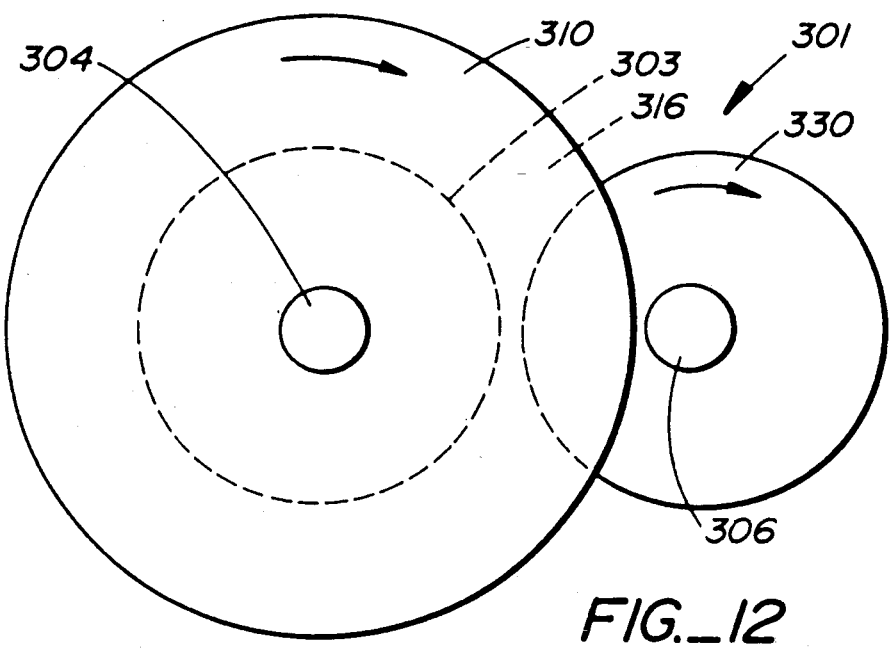
FIG._12
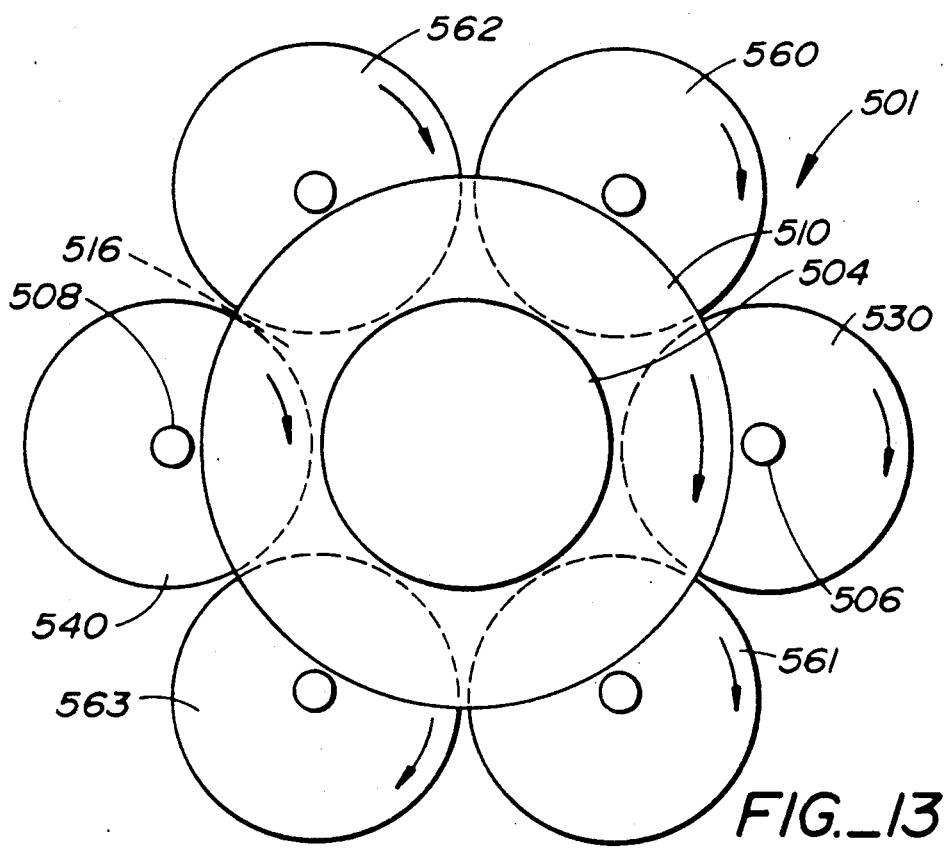
FIG._13

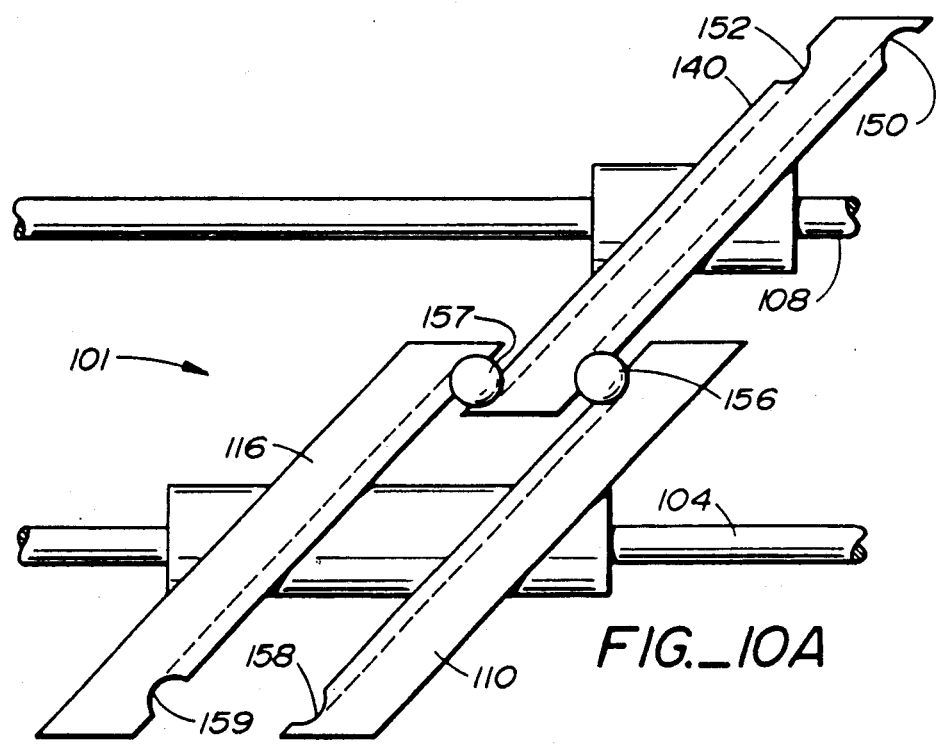
FIG._10A
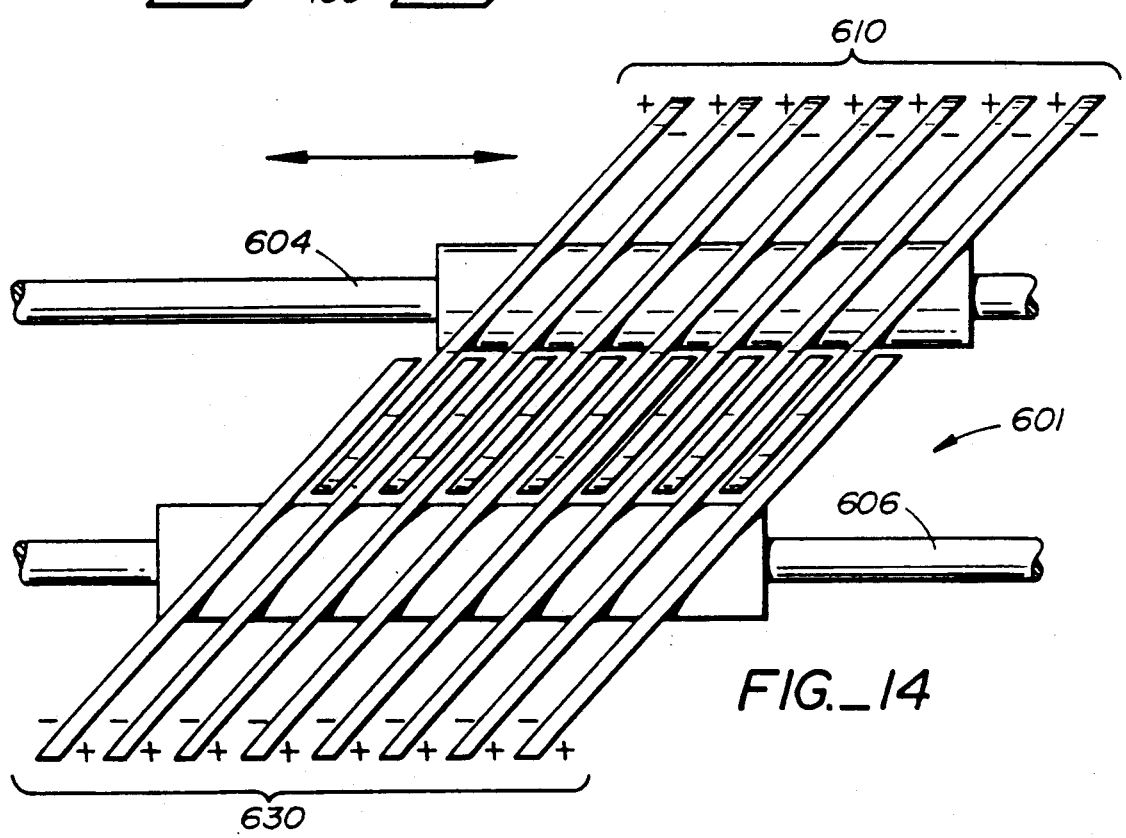
FIG._14

TRANSLATION/ROTATION CONVERSION APPARATUS

FIELD OF THE INVENTION

This invention relates to crankless mechanisms for converting translating or reciprocating motion into rotary motion, and vice versa, by means of cooperating slanted oval disks.

BACKGROUND OF THE INVENTION

Efforts have long been directed toward developing an engine, or more generally a gearing apparatus, which could accomplish the conversion of reciprocatory translational energy to continuous rotational energy without the use of a crankshaft. The crankshaft of an engine is prone to wear and failure, and is considered to be a mechanically inefficient mechanism for the conversion of such energy.

It is known to mount an oval plate (called, in the art, a "slant" or a "swash plate") obliquely on a rotational shaft to receive and convert translational movement. It has not been known, however, to mount a matching slant on the translational shaft to transmit the movement and assist in its conversion. Rather, conventional slant mechanisms use means as bearings, races or wheels to transmit the translational movement directly from the translational shaft to the slant on the rotational shaft.

Prior developments in this field may be generally illustrated by reference to the following patents:

| Patent No. | Patentee | Issue Date |
| --- | --- | --- |
| 2,170,058 | E. Larkin | Aug. 22, 1939 |
| 2,548,686 | T. Sherman | Apr. 10, 1951 |
| 1,819,826 | T. Sherman | Aug. 18, 1931 |
| 1,213,850 | J. Emley | Jan. 30, 1917 |
| 1,006,269 | W. Phifer | Oct. 17, 1911 |
| 960,575 | F. Negley | Jun. 07, 1910 |
| 1,127,065 | C. Milne | Feb. 02, 1915 |
| 2,387,908 | F. Howard | Oct. 30, 1945 |

Most of these patents show mechanical movements for engines and the like whereby translational movement is converted to rotary (or the reverse, in the case of the pump of U.S. Pat. No. 960,575) using slant apparatus.

U.S. Pat. Nos. 2,548,868, 1,819,826, and 2,170,058 utilize slipper bearings to connect reciprocating rods to rotating slants. U.S. Pat. Nos. 960,575 and 1,006,269 utilize rollers interconnected with the rods to engage tracks in the slants.

U.S. Pat. No. 1,127,065 has knobs on the periphery of the slant that engage sockets in the rods.

The rest of the patents are representative of what is in the art. For example, U.S. Pat. Nos. 1,213,850 and 2,387,908 illustrate "wabbler" drives, which drives utilize a type of motion somewhat similar to slant drives, but which drives are not true slants.

SUMMARY OF THE INVENTION

The present invention is a crankless apparatus which has at least one drive shaft that is free both to rotate and to translate from side to side. A follower shaft is free to rotate about its axis but is restrained from lateral movement. Oval disks, referred to herein as slants, are affixed to the shafts, preferably rigidly, normally with at least one shaft having one more slant than the others so that the slants of the others are sandwiched between those of the one. Each slant is mounted with its plane forming an angle with the axis of its shaft such that, when viewed along the line of the axis, its oval shape looks like a perfect circle.

When reciprocatory translational energy is applied to the drive shaft in the direction of its axis, the shaft begins to move back and forth along the line of its axis. The drive slants and the follower slants are then forced by their congruent and overlapping interconnection to execute together a complex form of mirrored spiral motion that causes the follower shaft to rotate in a smooth and continuous fashion. The drive shaft simultaneously begins to rotate, in addition to its initial impetus toward translation, in the same direction as the follower. This latter rotation may itself be useful in some applications, e.g. to eliminate certain gearing. Alternatively, the slants of the drive shaft can be mounted on bearings so that the slants turn instead of the drive shaft.

The device may be used, for example, in an internal combustion engine. A plurality of drives arranged in a circle around a single follower would be driven back and forth by gas combustion pistons. The drives, in turn, would cause the follower to rotate (in the manner of a crankshaft), which rotation could be used to power a transmission.

The function of the device may easily be reversed. That is to say, the rotating, non-reciprocating shaft may be the one which is powered. Its rotational energy may then be converted to translational energy by the device for use in, for example, a pump.

The device has many other potential uses, from industrial assemblies (in jigsaws, bicycles, helicopter-blade synchronizers and the like) to educational toys. Its movement is so fascinating that it can be viewed as kinetic sculpture. These suggestions are given as examples only, and are not meant to be limiting.

FEATURES AND ADVANTAGES

An object of this invention is to provide a translation/rotation conversion apparatus which includes a rotatable follower shaft having an oval follower slant mounted thereon at an oblique angle with respect thereto. A rotatable drive shaft is disposed parallel to the follower shaft and has an oval drive slant mounted on it at the same oblique angle with respect to it as the follower slant is mounted with respect to the follower shaft. Planar faces of the two slants are engaged together in flat overlapping relationship. At least one shaft, preferably the drive shaft, is free to translate back and forth as it rotates.

A further object is to provide casing means for mounting the shafts.

Yet another object is to provide apparatus wherein there is a plurality of drive shafts (e.g. in the case of a motor) and/or a plurality of follower shafts (e.g. in the case of a pump).

Still another object is to provide friction reducing means between the engaged faces of the follower and drive slants. The friction reducing means may be a ball bearing captured between bearing races in the slant faces; may be identically polarized magnetic poles on the engaged slant surfaces; or may be other useful friction reducing means of more or less conventional construction.

Another object is to disclose slants which preferably are disposed with respect to the shafts at oblique angles of from 30 to 60 degrees.

Yet another object is to disclose a follower shaft whose diameter is greater than that of the drive shafts.

Another object is to provide an apparatus which is easy to use, attractive in appearance and suitable for mass production at relatively low cost.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Certain terminology and derivations thereof may be used in the following description for convenience in reference only and will not be limiting. For example, the words "upwardly," "downwardly," "leftwardly," and "rightwardly" will refer to directions in the drawings to which reference is made. The words "inwardly" and "outwardly" will refer to directions toward and away from, respectively, the geometric center of a device and designated parts thereof.

BRIEF DESCRIPTION OF THE DRAWING

FIG. 1 is a top plan view of a preferred embodiment of the invention in a first position;

FIG. 2 is plan view of the apparatus of FIG. 1 in a second position;

FIG. 3 is a plan view of the apparatus of FIG. 1 in a third position;

FIG. 4 is a plan view of the apparatus of FIG. 1 in a fourth position;

FIG. 5 is a plan view of the apparatus of FIG. 1 in a fifth position;

FIG. 6 is a plan view of the apparatus of FIG. 1 in a sixth position;

FIG. 7 is a plan view of the apparatus of FIG. 1 in a seventh position;

FIG. 8 is a plan view of the apparatus of FIG. 1 in an eighth position;

FIG. 9 is an end view of the apparatus of FIG. 1;

FIG. 10 is a schematic end view of a second embodiment of the invention,

FIG. 10A being a broken frontal elevation of the slants of the device of FIG. 10;

FIG. 11 is a schematic end view of a third embodiment of the invention;

FIG. 12 is a schematic end view of a fourth embodiment of the invention;

FIG. 13 is a schematic end view of a fifth embodiment of the invention; and

FIG. 14 is a broken frontal elevation of the slants of a sixth alternate embodiment of the invention.

DRAWING REFERENCE NUMERALS 1 conversion apparatus
2 casing of 1
4 follower shaft of 1
6 drive shaft of 1, rear
8 drive shaft of 1, front
10 slant of 4, right
12 face of 10, outer
14 face of 10, inner
15 hub of 10
16 slant of 4, left
18 face of 16, outer
20 face of 16, inner
21 hub of 16
22 thrust bearing of 4
24 thrust bearing of 4
30 slant of 6
32 face of 30, right
34 face of 30, left
36 hub of 30
37 bearing of 6
38 bearing of 6
40 slant of 8
42 face of 40, right
44 face of 40, left
46 hub of 40
47 bearing of 8
48 bearing of 8
101 conversion apparatus
104 follower shaft of 101
108 drive shaft of 101
110 slant of 104, right
116 slant of 104, left
140 slant of 108
150 bearing race of 140, right face
152 bearing race of 140, left face
156 ball bearing of 150,158
157 ball bearing of 152,159
158 bearing race of 110
159 bearing race of 116
201 conversion apparatus
204 follower shaft of 201
206 drive shaft of 201, rear
208 drive shaft of 201, front
210 slant of 204, right
216 slant of 204, left
230 slant of 206
240 slant of 208
260 slant of 201, third
261 slant of 201, fourth
301 conversion apparatus
303 area of 301
304 follower shaft of 301
306 drive shaft of 301
310 slant of 304, right
316 slant of 304, left
330 slant of 306
501 conversion apparatus
504 follower shaft of 501
506 drive shaft of 501, rear
508 drive shaft of 501, front
510 slant of 504, right
516 slant of 504, left
530 slant of 506
540 slant of 508
560 slant of 501, third
561 slant of 501, fourth
562 slant of 501, fifth
563 slant of 501, sixth
601 conversion apparatus
604 follower shaft of 601
606 drive shaft of 601
610 slants of 604
630 slants of 606

DESCRIPTION OF A PREFERRED EMBODIMENT

Referring to FIG. 1, there is illustrated therein a crankless translation/rotation conversion apparatus 1 of this invention. Apparatus 1 generally comprises casing 2, rear drive shaft 6, front drive shaft 8, and follower shaft 4, all made of suitable metal. Alternatively, plastic or wood might be used—for example, in apparatus employed in education and training.

The front and rear drive shafts have oval slants 30,40, respectively, which are obliquely and firmly attached by locking hubs 36,46. The follower shaft preferably has a pair of slants, right 10 and left 16, obliquely attached by locking hubs 15,21, respectively, although in some applications, a single follower slant may suffice.

Follower shaft 4 is carried through the casing 2 by bearings or packing boxes 22,24. These are of the type which will constrain the shaft from translation while allowing it free rotation, which will be referred to herein as "thrust bearings". Other means could be incorporated into a device to prevent the follower shaft from translating, e.g. the ends of the shaft could abut up against fixed parts of the casing or other immovable walls (provided suitable friction-reducing means would be incorporated at those ends). Rear drive shaft 6 is carried by bearings or packing boxes 37,38. These are of the type which allow both free rotation and free straight-line translation. Front drive shaft 8 is carried by bearings or packing boxes 47,48, which are also of the free rotation and free translation type.

Right follower slant 10 has smooth, flat outer 12 and inner 14 faces. Left follower slant 16 has similar outer 18 and inner 20 faces. Only the inner faces of slants 10,16 receive and transmit pressure in this embodiment. Rear drive slant 30 has right 32 and left 34 faces. Front drive slant 40 has right 42 and left 44 faces. Both faces of drive slants 30,40 receive and transmit pressure and, therefore, should be smooth.

The drive slants are preferably sandwiched between the paired follower slants so as to be captured and constrained by the latter. Thus, all slants are forced to execute parallel and congruent movements together, as will be readily apparent from the drawing. It is to be noted, however, that such capture could as readily be effected by using paired drive slants acting in cooperation with a single follower slant.

Furthermore, the terminology "drive" and "follower" are adopted from the point of view of using the conversion apparatus 1 in an engine. That is to say, the drive shafts 6,8 could be used as piston rods terminating in pistons. The pistons would be held within the cylinders of an internal combustion engine (not illustrated). Reciprocatory translational energy in the piston rods 6,8 would be converted to rotational energy in the follower 4. The follower 4, in turn, could be used to drive a transmission—without the need for a crankshaft. Alternatively, the device could be used as a pump, among other things, wherein shaft 4 would be turned by gears or a pulley (becoming the "drive" shaft). Its rotational energy would be converted to reciprocatory translational energy in the shafts 6,8 (the latter then becoming the "follower" shafts). The shafts 6,8 would be attached to suction pistons of standard pump design (not illustrated).

In the device of FIG. 1, it can be seen that the slants are affixed to the shafts with their planes intersecting the axes of the shafts at an angle A of 45 degrees. At this angle, the mechanical advantage is theoretically one, the same as a matched pair of frictionless 45 degree wedges. In the case of converting translation to rotation, the mechanical advantage can be increased by decreasing the size of angle A or can be decreased by increasing the size of angle A. In the case of case of converting rotation in shaft 4 to translation in shafts 6,8, an increase in angle A increases mechanical advantage. In practice, it should be possible to make the slant angles variable by the operator, at least for certain applications. Angles in the range of 30 to 60 degrees are expected to produce the most efficient results. However, the invention is not limited to this range of angles.

Turning briefly to FIG. 9, which shows a right end elevation of conversion apparatus 1, it can be seen that the oval slants 10,16,30,40, (slant 16 being hidden) appear to be circles when viewed on end. While this produces the most efficient coordination of motion transfers between the slants, it is by no means necessary. The slants can be other shapes, as long as they overlap within their minimum effective radii of rotation. In other words, they would always have, at a minimum, areas which would appears as overlapping circles when viewed on end as in FIG. 9, irrespective of any irregularly shaped areas that might extend beyond these overlapping circles. For example, even square slants would work, given sufficient overlap. However, for normal applications, the oval shape will produce the most efficient results.

It is to be noted that the device may accommodate rotation in either direction. Counter-clockwise rotation is shown in FIGS. 1-8 and clockwise rotation is shown in FIGS. 9-13.

It is difficult to describe in words the complex but smooth-flowing oscillatory or gyratory motion undertaken by the slants acting together. Aesthetically speaking, it is quite striking, even beautiful. Such motion may be best understood by careful study of FIGS. 1-8, which represent successive ⅛ turns of the follower shaft 4 (and drive shafts 6,8), resulting in the drive shafts undertaking one full stroke.

FIG. 1 illustrates the apparatus 1 at the point of maximum drive shaft extension, i.e. the point at which drive shaft 6 would be about to start the power stroke were its left end connected to a piston in a combustion cylinder. In fact, all four ends of the drive shafts could be attached to pistons.

It may be found to be necessary to start the apparatus with a slight "priming" rotation, since applying translational force to a drive shaft when the device is at rest could cause the device to jam or to start rotating in the wrong direction.

FIG. 2 shows the apparatus after ⅛ cycle, during the application of force to the left end of rear drive shaft 6. The right face 32 of drive slant 30 has pushed, and continues to push, against the inner (or left) face 14 of follower slant 10, causing both slants to turn counter-clockwise while drive shaft 6 moves to the right. Drive shaft 8 is on a return or un-powered stroke (assuming for the moment that force is applied only at the left ends of shafts 6,8). Shaft 8 is pushed to the left, also turning counter-clockwise as it goes, by pressure of the inner face 14 of slant 10 against the right face 42 of its slant 40 (drive slant 40 acting for the moment as a follower).

It should be noted that in some applications it would be undesirable for a translating shaft to be forced, through action of the slants, to rotate as it moves from side to side. In such cases, the slants on the translating shaft can be affixed by hubs that have bearings which allow said slants to rotate about the shaft, rather than forcing the slants and shaft to rotate together. With the fixed hubs 36,46 shown in the drawing, translating shafts 6,8 rotate along with their respective slants 30,40, as previously noted. Obviously, the shaft in which rotation is desired, e.g. follower 4, must always have its slant or slants attached by fixed hubs, or by other non-rotatable means such as welding.

In FIG. 3, drive shaft 6 is ½ way through its power stroke and drive shaft 8 (here following) is ½ way through its return stroke.

FIG. 4 represents another ⅛ turn of the follower shaft 4, prior to reaching the position of FIG. 5, which latter Fig. shows the apparatus at the point of maximum drive shaft extension opposite from the starting position of FIG. 1. In FIG. 5, the power stroke of shaft 6 is completed, the return stroke of shaft 8 is completed, and the power stroke of the latter is about to begin (again, assuming pistons at only the left ends of shafts 6,8).

FIG. 6 shows the apparatus after an additional ⅛ cycle, during the application of force to the left end of front drive shaft 8. The right face 42 of drive slant 40 has pushed, and continues to push, against the inner face 14 of follower slant 10, causing both slants to continue to turn counter-clockwise as drive shaft 8 moves to the right. Drive shaft 6 is now on its return or un-powered stroke. It is pushed to the left by pressure of the inner face 14 of slant 10 against the right face 32 of drive slant 30 (slant 30 and drive shaft 6 now acting as followers).

In FIG. 7, drive shaft 8 is ½ way through its power stroke and drive shaft 6 is ½ way through its return stroke, analogous to the opposite midpoint previously illustrated in FIG. 3.

FIG. 8 represents another ⅛ turn of the follower shaft 4 prior to returning to the position of FIG. 1, which latter Fig. shows the apparatus again at a point of maximum drive shaft extension—opposite from the position of FIG. 5. In FIG. 1, the power stroke of shaft 8 is completed, the return stroke of shaft 6 is completed, and the power stroke of the latter is about to begin once more.

It can be noted from the above discussion that, in theory, the left follower slant 16 takes no part in the transmission of leftwardly directed forces which are applied to the leftmost ends of shafts 6,8, and therefore might be done away with in certain applications. However, it is contemplated that pistons, or other force-producing devices would be applied to both ends of both shafts 6,8. This would require the second follower slant 16—to transmit the rightwardly directed forces. Furthermore, in practice, it is likely that at least one shaft will have to have one more slant than its adjacent shaft—to prevent wobbling, misalignment and the like. Finally, the invention may be practiced with a multiplicity of parallel slants on each shaft, in order to distribute the forces encountered in the conversion operation and reduce friction.

A wide variety of drive and follower slants are possible, some of which are shown schematically in FIGS. 10–14. It is to be noted that, for convenience, the last two positions of the reference numerals of alternate embodiments of the invention duplicate those of the numerals of the embodiment of FIG. 1, where reference is made to corresponding or equivalent parts.

In FIGS. 10 and 10A, conversion apparatus 101 has a single drive slant 140 affixed to drive shaft 108. Slant 140 is sandwiched between follower slants 110,116 (the latter hidden in FIG. 10) of follower shaft 104. Again, the roles of driver and follower may easily be reversed. To reduce friction, spherically-concave annular bearing races 150,152 are embedded in each face of the drive slant 140. Two matching annular bearing races 158,159 are embedded in the inner faces of the follower slants 110,116, respectively. Two ball bearings 156,157 are trapped to run in the races, one each to race pair, (races 150,158 and 152,159, respectively). Conventional roller bearings, gear mechanisms and the like may also be used to reduce friction. Free-moving ball bearings could be replaced by fixed slipper-pad bearings, such as those used by the single-slant devices of the prior art.

As one additional example, to reduce friction, opposed faces of matched drive and follower slants could be magnetized with the same poles or charged with the same electrical charges, in order to repel each other. FIG. 14 shows a conversion apparatus 601 wherein friction between the slants 610 of the follower shaft 604 and the slants 630 of the drive shaft 606 is reduced in this manner. As in apparatus 601, many applications will benefit from the use of a large plurality of drive and follower slants acting in cooperation along parallel or annular rows.

Yet another example of friction-reducing means would be a force-splash system, wherein oil is pumped through lines and centrifugal force is used to spread it over flat areas of disk or over bearings. Friction-reducing means, such as those illustrated in FIGS. 10 and 14 should be incorporated into most, if not all, embodiments of the invention. However, such means have been omitted from the rest of the drawing, for clarity of illustration.

FIG. 11 shows a translation/rotation conversion apparatus 201 that utilizes four drive slants 230,240,260,261, each mounted on drive shafts, such as 206,208. Such an apparatus might be used, for example, in an eight cylinder engine. While the follower slants 210,216 may be of the same diameter as the drive slants (as shown in FIG. 11) it would be preferable to enlarge the follower shaft 204 with respect to the drive shafts, due to the increased load on the former.

The follower and drive slants also do not have to be the same size. In apparatus 301 of FIG. 12, follower slants 310,316 are of a diameter at least twice that of the single drive slant 330 (speaking of the diameters of the illusory circles formed when the oval slants are viewed on end). This leaves the area within the dotted line 303 of the follower slant untouched by the drive slant. The loads being similar, shafts 304,306 may be of similar diameter.

Finally, the conversion apparatus 501 of FIG. 13 has six drive slants 530,540, and 560–563, each mounted on drive shafts, such as 506,508. Such an apparatus might be used, for example, in a twelve cylinder engine. The follower slants 510,516 are of increased diameter compared to the drive slants. Due to the great load imparted to a follower shaft 504 being driven by six drive shafts, its diameter can be increased greatly, as long as it remains within the extent of the free area that is not located within the turning radii of the drive shafts. In practice, however, it is unlikely to be necessary to increase the diameter of shaft 504 to the extent shown in FIG. 13.

It is to be repeated that any number of cooperating slants may be mounted on the follower shafts and drive shafts of any of the embodiments of the invention discussed herein, the particular number illustrated having been selected for convenience of discussion only.

While the above provides a full and complete disclosure of the preferred embodiments of this invention, various modifications, alternate constructions, and equivalents may be employed without departing from the true spirit and scope of the invention. Such changes might involve alternate materials, components, structural arrangements, capacities, sizes, timing, operational features or the like. For example, the action of follower (or drive) shafts could be combined together. Thus, in FIG. 1, shaft 6 could be fixed (free to rotate only), causing shaft 4 to translate. Shaft 4, in turn, would cause shaft 8 also to translate.

As another variation, in FIG. 13 adjacent pairs of drive slants 530,540,560-563 could themselves overlap (in addition to each overlapping follower slants 510,516). Therefore, the above description and illustrations should not be construed as limiting the scope of the invention which is defined by the appended claims.

What is claimed is:

1. Translation/rotation conversion apparatus including:
   a rotatable follower shaft;
   a follower slant mounted on the follower shaft at an oblique angle with respect to the follower shaft, the follower slant having a first planar face; a rotatable drive shaft disposed parallel to the follower shaft;
   a drive slant mounted on the drive shaft at the same oblique angle with respect to the drive shaft as the follower slant is mounted with respect to the follower shaft,
   the drive slant having a second planar face; and wherein
   the second face is engaged in flat overlapping relationship with the first face and at least one shaft is free to reciprocally translate.

2. The apparatus of claim 1 further including:
   casing means for mounting shafts.

3. The apparatus of claim 2 wherein:
   there are a plurality of drive shafts.

4. The apparatus of claim 2 wherein:
   there are a plurality of follower shafts.

5. The apparatus of claim 2 further including:
   friction-reducing means disposed between the first and second faces.

6. The apparatus of claim 5 wherein:
   the friction-reducing means includes
      a first annular bearing race in the first face;
      a second annular bearing race in the second face,
      the races opposing each other in cooperating relationship;
      a ball bearing mounted in the races.

7. The apparatus of claim 6 wherein:
   the follower shaft has at least two follower slants.

8. Translation/rotation conversion apparatus including:
   at least two rotatable shafts, the shafts disposed parallel to one another;
   at least one slant mounted on each shaft at an oblique angle with respect to its respective shaft, all slants being mounted at the same oblique angle;
   at least one planar face on each slant;
   and wherein at least one planar face of each slant is engaged in flat overlapping relationship with a planar face of another slant and
   at least one shaft is free to reciprocally translate.

9. The apparatus of claim 8 further including:
   friction-reducing means disposed between the engaged overlapping planar faces.

10. The apparatus of claim 9 wherein:
    the friction-reducing means includes
       an opposed pair of annular bearing races containing a ball bearing.

11. The apparatus of claim 9 wherein:
    the friction-reducing means includes
       identical electrical charges formed on the engaged overlapping planar faces.

12. The apparatus of claim 11 wherein:
    there are a multiplicity of shafts which are free to reciprocally translate.

13. Translation/rotation conversion apparatus including:
    casing means for mounting shafts;
    a rotatable non-translatable follower shaft mounted on the casing means;
    two oval follower slants mounted on the follower shaft, each follower slant having a planar face, the planar faces of the follower slants facing each other in matching spaced parallel relationship, each face being disposed at the same oblique angle with respect to the follower shaft as is the other face;
    at least two reciprocally translatable drive shafts mounted on the casing means, each drive shaft mounted parallel to the follower shaft;
    an oval drive slant mounted on each drive shaft, each drive slant having a pair of parallel planar faces on opposite sides of that drive slant, the planar faces of each drive slant being disposed at the same oblique angle with respect to their respective drive shafts as are the faces of the follower slants with respect to the follower shaft; and
    wherein the opposite faces of each drive slant are engaged between the facing faces of the follower slants in flat overlapping relationship thereto.

14. The apparatus of claim 13 wherein:
    the oblique angle is between 30 and 60 degrees.

15. The apparatus of claim 14 wherein:
    the oblique angle is 45 degrees.

16. The apparatus of claim 14 wherein:
    the follower shaft is of larger diameter than the at least two drive shafts.

17. The apparatus of claim 16 wherein:
    there are a multiplicity of drive shafts.

18. The apparatus of claim 17 further including:
    friction-reducing means disposed between the engaged overlapping faces.

* * * * *